(12) United States Patent
Noldus et al.

(10) Patent No.: US 10,893,140 B2
(45) Date of Patent: Jan. 12, 2021

(54) METHOD, SYSTEM AND DEVICE FOR AN ENHANCED CALL SETUP WITH VERIFICATION OF A USER EQUIPMENT IN A TELECOMMUNICATIONS NETWORK

(71) Applicant: Telefonaktiebolaget LM Ericsson (publ), Stockholm (SE)

(72) Inventors: Rogier August Caspar Joseph Noldus, Goirle (NL); Henk Huitema, Dongen (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/066,255

(22) PCT Filed: Dec. 31, 2015

(86) PCT No.: PCT/EP2015/002616
§ 371 (c)(1),
(2) Date: Jun. 26, 2018

(87) PCT Pub. No.: WO2017/114541
PCT Pub. Date: Jul. 6, 2017

(65) Prior Publication Data
US 2019/0007553 A1    Jan. 3, 2019

(51) Int. Cl.
*H04M 3/436* (2006.01)
*H04M 3/42* (2006.01)
*H04M 3/22* (2006.01)
*H04W 4/16* (2009.01)

(52) U.S. Cl.
CPC ......... *H04M 3/436* (2013.01); *H04M 3/2281* (2013.01); *H04M 3/42059* (2013.01); *H04M 2203/6027* (2013.01); *H04M 2203/6045* (2013.01); *H04W 4/16* (2013.01)

(58) Field of Classification Search
CPC combination set(s) only.
See application file for complete search history.

(56) References Cited

U.S. PATENT DOCUMENTS

| | | | |
|---|---|---|---|
| 10,149,156 B1* | 12/2018 | Tiku | H04W 12/06 |
| 2009/0217039 A1* | 8/2009 | Kurapati | H04L 63/126 713/168 |
| 2011/0211572 A1* | 9/2011 | Campion | H04L 12/66 370/352 |

FOREIGN PATENT DOCUMENTS

WO    2008093306 A2    8/2008

* cited by examiner

*Primary Examiner* — Muthuswamy G Manoharan
(74) *Attorney, Agent, or Firm* — Murphy, Bilak & Homiller, PLLC

(57) ABSTRACT

A method system and device are described as a solution for a called party that receives a call from a calling party that intends to be another calling party by means of A-number spoofing. The method comprises a verification request by the called party network during a call setup, made to the network of the assumed calling party. The address of the network of the assumed calling party is derived from the Calling Party Number CgPN identifier or Calling Line Identification CLI as provided by a call setup. When the CgPN is correctly provided, a verification request with the network where the calling party resides will yield status information that the calling party indeed has a call setup with the called party. When the A-number is spoofed, the verification will not yield status information that the calling party has a call setup with the called party.

10 Claims, 13 Drawing Sheets

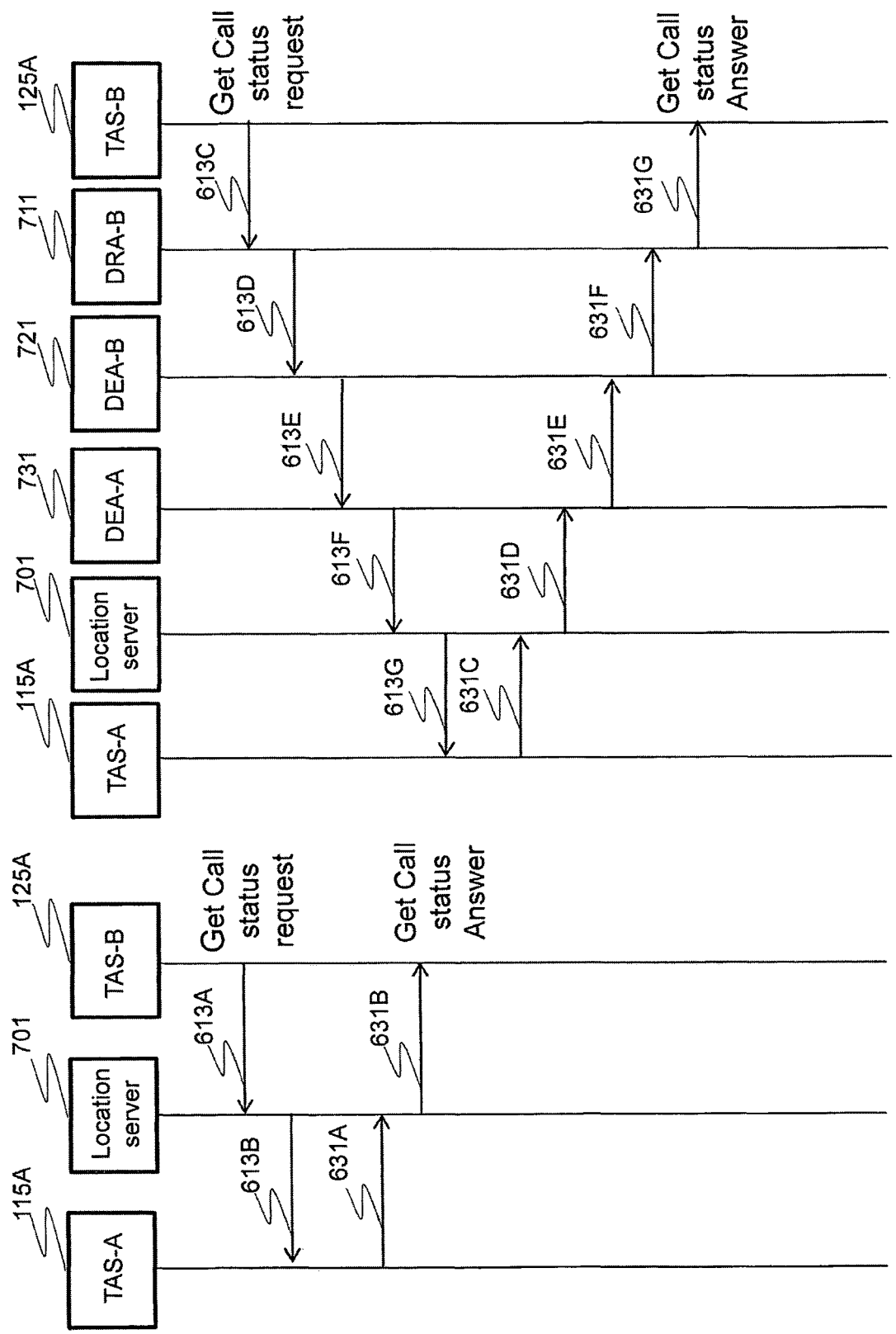

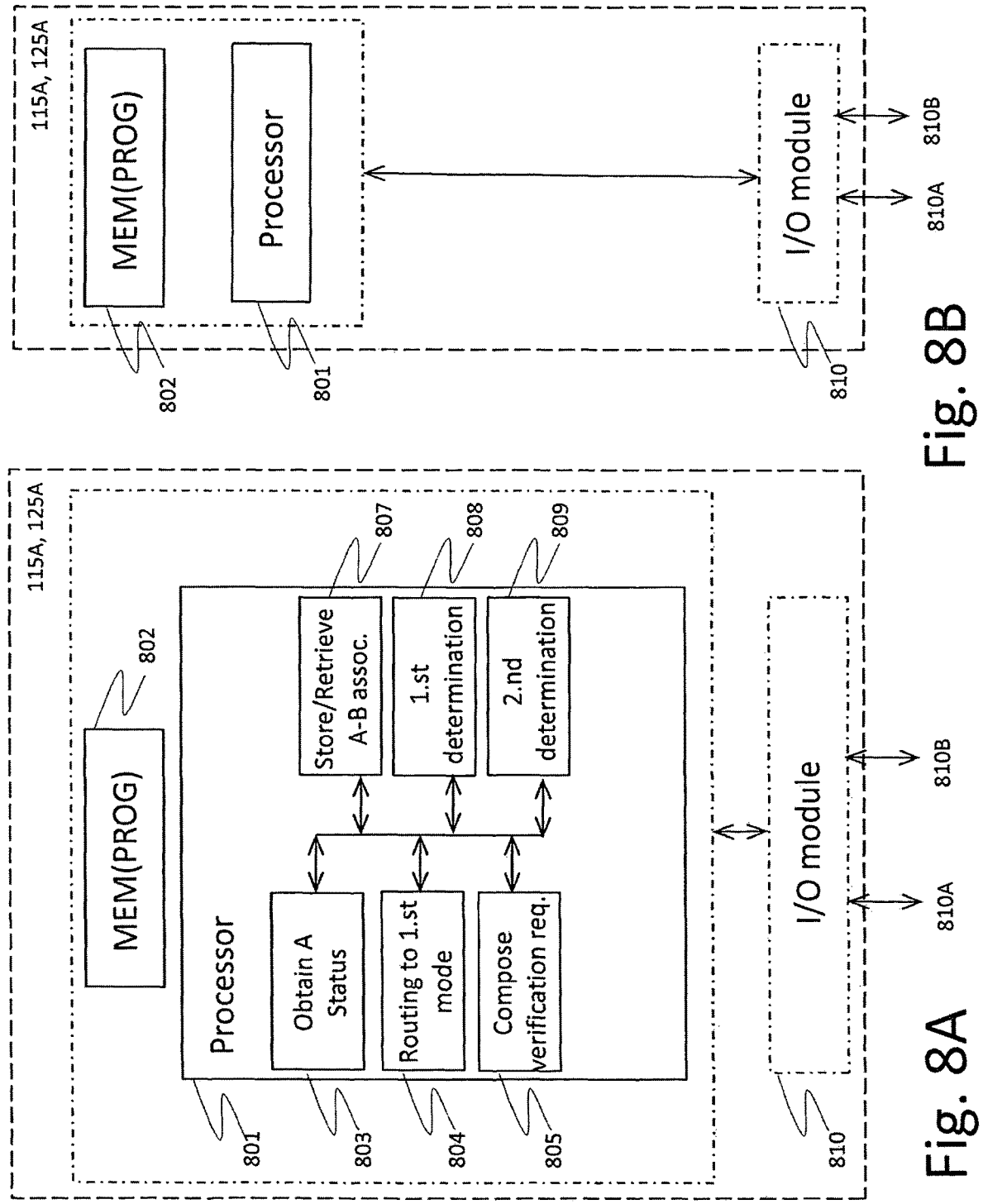

METHOD, SYSTEM AND DEVICE FOR AN ENHANCED CALL SETUP WITH VERIFICATION OF A USER EQUIPMENT IN A TELECOMMUNICATIONS NETWORK

TECHNICAL FIELD

The present invention relates generally to a method, system and device to enable a telecommunication network to provide a subscriber with an enhanced call setup with a verification of an assumed calling User Equipment.

BACKGROUND

In the telecommunication environment, it may occur that phone calls are presumed to be initialized by another person or entity than the one shown by the Calling Line identity (CLI). Several names have been allocated to this phenomenon, such as "fake calls", "bogus calls" or "spoofed calls". The last term will be used to indicate this type of calls in the remainder of the description.

In general the telecommunication environment is regarded as a trusted environment, making this phenomenon even more unwanted as operators would like remain, at least in the perception of their subscribers, to be regarded as trustful partner.

The cause of these spoofed calls can be found in several sources:

There are service providers that do offer a "service" whereby end-users can establish calls with a Calling. Party Number (CgPN) other than their own. A caller can in this way pretend to be someone else, by using that other person's public identity as CgPN. This deceitful service may lead to unpleasant situations (for the called party) or even to fraud, e.g. when using a spoofed number when calling agents or automatic systems that use the CgPN for authentication.

Although the network is regarded as reliable and trusted, the interconnection between networks of different providers is an Internet connection, which should be secured, but hackers should not be underestimated in their quest for finding openings to connect to an operator's network in a malicious way.

The call with a spoofed CgPN, is normally established from outside the network of the called party, or is routed through another network. Example:

A call is established from an IP service node or application server in a foreign network; the call is routed towards the network of the called party;

A call is established from a switch in the network of the called party; the call is routed towards a service node or application server in a foreign network, from where the call is routed (back) towards the network of the called party;

A call is established from a switch in a network not being the called party's network, in the same country as the network of the called party; the call is routed towards a service node or application server in the foreign network, from where the call is routed towards the network of the called party.

When the call enters the network of the called party, the control plane signaling message contains a calling party identity. In the case of ISDN (Integrated Services Digital Network) User Part (ISUP), the calling party identity (also known as A-party identity or calling User Equipment (UE)) is the Calling Party Number, contained in an ISUP Initial Address Message (IAM). In the case of Session Initiation Protocol (SIP) interconnect, the calling party identity is the P-asserted-id (PAI) in the Invite request. The network of the called party has no knowledge of the authenticity of the A-party identity. The network establishes the call and retains the CgPN in the signaling.

Regarding a method how one could possibly invoke a service which provides a spoofed CgPN to the called party via an operator providing these spoofed calls service:

The service node or application server in a foreign network may e.g. be accessed via the Internet. This may, for example, be from an application (app) on a Smartphone. The application allows the calling party to establish an IP call to an application server and to provide an A-party number that the calling party would like to present towards the called party. Once this call is established into the public network, it will be transparent for the signaling system (Mobile Switching Centres (MSCs), transit switches, gateway switches) that the CgPN for this call has been spoofed. Hence, the call is routed towards the destination network, typically a Public Switched Telephone Network (PSTN) in the same country as where the malicious person is calling from, and the call is then offered to the called party. The spoofed CgPN is presented to the called party.

The above-described scenario requires that this service node (application server) has access to the PSTN.

Some operators have reverted to applying the following treatment to calls entering their network, for calls that are destined for the voicemail system. The switch at the boundary of the operator's network determines that an incoming call is destined for the voicemail box (for voicemail deposit and voicemail retrieval). The switch then adds a designated prefix to the Calling party number or to the Called party number, the choice between these two being operator-dependent. The call is then routed towards the voicemail system, as required.

If the prefix is added to the Called Party number (CdPN), as opposed to being added to the CgPN, then the prefix will be chosen such that it does not affect the routing of the call through the operator's network.

When the voicemail system detects the prefix, it prompts the calling party to provide a pin code. In this manner, malicious callers are prevented from entering a person's voicemail box through A-number spoofing. This solution works, however, for calls destined to voicemail box only. There are various other systems that use the A-party number as input parameter for service logic process execution.

Another proposed solution entails that the UE of the B-party establishes a parallel call, almost simultaneously when being called, towards the assumed A-party number. The result of such call establishment would provide an indication whether this A-party is indeed establishing a call at this very moment. This method is, however, practically not feasible. One reason is that the cellular mobile devices as well as (wireline) PSTN devices don't allow for establishing or receiving a second call, whilst another call (the first call) is in establishment.

For calls to automated system, or even calls made by automated systems to automated systems, the authenticity is not as easy noted as for calls to humans, detecting the A-number spoofing generally in an early stage of communication session establishment.

In the remainder of this description, the Calling party number (CgPN) for a call that might have a spoofed CgPN is indicated as "assumed calling UE", expressed as such, as a call setup is only suspicious until it is determined that the call setup is spoofed, i.e. the CLI indicates another UE that is not setting up a call to the CdPN.

Hence, there is a need for an improved method, system and device to enable a telecommunication network to provide a subscriber with an enhanced call setup with a verification of the assumed calling UE.

SUMMARY

It is an object to provide an improved method, system and device to enable a telecommunication network to provide a subscriber with an enhanced call setup with a verification of the assumed calling UE.

The solution provides a method with a verification of an assumed calling User Equipment (UE) in a telecommunications network. The network comprises a Telephone Application Server, belonging to a first network or A-network, TAS-A, a Telephone Application Server belonging to a second network or B-network, TAS-B, the assumed calling UE and a called UE.

The method comprises as a first step that the assumed calling UE transmits a call setup request, wherein the call setup request comprises an identifier identifying the assumed calling UE. This call setup request is received by TAS-B which performs a first determination whether a verification of the assumed calling UE is required. Assuming this is the case, the TAS-B transmits a verification request TAS-A, wherein the verification request comprises the assumed calling UE identifier. This TAS-A receives the request and obtains a status information indicative for the assumed calling UE, that is assumed to have a call setup.

The TAS-A transmits the status information associated with the identifier of the assumed calling UE in response to the verification request back to TAS-B which performs a second determination whether, depending on the received status information, a signaling of the call setup with the called UE is to be established.

When transmitting of the verification request is prepared, the assumed calling UE identifier is analyzed for defining how to route the verification request towards the TAS-A, and thereafter the verification request is composed for a transmission to the TAS-A. In a first determination it is determined whether the called UE is subscribed to a call verification service. Additionally when the call setup request omits a predetermined identifier the service is invoked.

The verification request can be performed in the TAS-A, whereto the verification request is composed with the identifier identifying the called UE.

The verification in the TAS-B is performed based on the replied status information regarding the assumed calling UE, according to predefined rules to initialize the signalling of the call setup towards the called UE.

The method for a call setup with a verification of an assumed calling User Equipment (UE) is proposed to be applied in the TAS-B wherein the TAS-B performs a step of receiving from the TAS-A a call setup request, initialized by the assumed calling UE, wherein the call setup request comprises an identifier identifying the assumed calling UE. The TAS-B further performs the step of a first determination whether a verification of the assumed calling UE is required.

The TAS-B also performs a step of transmitting a verification request to the TAS-A, wherein the verification request comprises the assumed calling UE identifier;

The TAS-B performs the further step of receiving from the TAS-A a status information for the UE, that is associated with the identifier of the assumed calling UE. Additionally the TAS-A performs a second determination whether, depending on the status information received, to initiate a signaling of the call set up with the called UE.

The method in the TAS-B comprises a transmitting step of the verification request to the TAS-A wherein this step further comprises analyzing of the assumed calling UE identifier for defining how to route the verification request towards the TAS-A, and composing this verification request for transmission to the TAS-A.

The routing of the verification request may also involve a location server which is requested for the address of the TAS-A, where the address of the location server is analyzed from the identifier identifying the assumed calling UE, and subsequently retrieving the address of the TAS-A from this location server.

The method opens the possibility that the verification is performed in TAS-A, such that the verification request additionally comprises an identifier identifying the called UE. TAS-A can check the identifiers of the assumed calling UE and the called UE as provided in the verification request against the actual calling UE and called UE.

When the verification occurs in TAS-B, the replied status information from TAS-A is applied to verify whether the assumed calling UE is having a call setup to the called UE, or having a call with the called UE.

The verification may occur in TAS-B during a call setup by the assumed calling UE, during a call, or after a call between the assumed calling UE and the called UE.

The method in the TAS-A for a call setup with a verification of an assumed calling User Equipment (UE) comprises a step of receiving a verification request that results from a call setup request of the assumed calling UE. This verification request comprises an identifier identifying the assumed calling UE. A next step of the TAS-A is the obtaining of a status information for the UE, that corresponds to the identifier identifying the assumed calling UE. The obtained status information is transmitted towards the TAS-B.

The verification request received by the TAS-A additionally comprises an identifier identifying the called UE, such that the TAS-A is enabled the check whether the assumed called party has a call setup with the called party, or has a call with the called party.

The verification in the TAS-A can be performed with status information that is previously stored during a call setup in the TAS-A when the TAS-A received the call setup.

When the verification occurs in the TAS-B, the TAS-A is expected to transmit status information on the assumed calling UE towards the TAS-B, such that the TAS-B is enabled to make a further determination.

The solution provides network with a Telephone application Server, TAS-A or TAS-B, wherein the network is arranged for a call setup with a verification of an assumed calling User Equipment. The network comprises the TAS-A, the TAS-B, the assumed calling UE and a called UE, TAS-A, TAS-B, the assumed calling UE, and the called UE are communicatively connected.

The TAS-B is arranged to compose a verification request when a determination determines that the assumed calling UE, that is setting up the call should be verified. The verification request will comprise an identifier identifying the assumed calling UE.

The TAS-A is arranged to receive the verification request, and to obtain a. status information for the assumed calling UE that has the identifier indicated in the verification request. TAS-A is further arranged to submit the status information to the TAS-B. The TAS-B is further arranged to receive the status information from the TAS-A, and is arranged to determine, based on the status information, whether the call setup is signalled with the called UE.

The network is further arranged to provide the TAS-B with the status information obtained, in a form wherein the status information confirms that the assumed calling UE is having a call setup with the called UE. The network is configured to either have the verification occur in the TAS-A or the TAS-B.

The TAS-B is arranged to cooperate in a call setup with a verification of an assumed calling User Equipment (UE), wherein the TAS-B is arranged to receive, via an I/O module, a call setup request resulting from a call setup request by the assumed calling UE.

The call setup request comprises an identifier identifying the assumed calling UE. The TAS-B is further arranged to compose, by the compose verification request module a verification request which comprises the assumed calling UE identifier, and wherein the address of the selected TAS-A is based on the assumed calling UE identifier.

The TAS-B is further arranged to determine an address of the TAS-A where to route the verification request to by the routing to the TAS-A module.

The TAS-B is further arranged to transmit, via the I/O module the verification request towards the address of the TAS-A, and arranged to receive via the I/O module, a status information for a UE that has the identifier identifying the assumed calling UE.

The TAS-B is still further arranged to determine with a determiner module, based on the status information, whether the call setup is signaled with the called UE.

The TAS-A is arranged to cooperate in a call setup with a verification of an assumed calling User Equipment (UE), and wherein the TAS-A is arranged to receive via the I/O module a verification request that results from a call setup request of the assumed calling UE.

The verification request, received by the TAS-A, comprises an identifier identifying the assumed calling UE.

The TAS-A is further arranged to obtain a status information for the UE that has the identifier identifying the assumed calling UE, and is still further arranged to transmit the obtained status information towards the TAS-B.

A TAS-B comprising modules is proposed, wherein this TAS-B is arranged to cooperate in a call setup with a verification of an assumed calling User Equipment (UE), comprising a first receiver module, arranged to receive a call setup request resulting from a call setup request of the assumed calling UE, wherein the call setup request comprises an assumed calling UE identifier.

The TAS-B further comprising a first determination module arranged for determining whether a verification of the assumed calling UE is required.

The TAS-B still further comprising a transmitter module arranged for transmitting a verification request towards the TAS-A, which is assumed to be associated to the assumed calling UE, wherein the address of the TAS-A is based on the assumed calling UE identifier. The TAS-B still further comprising a second receiver module arranged for receiving a status information result from the TAS-A, in a response to the verification request, and comprising a second determination module arranged for determining a call setup signaling based on the received status information.

A TAS-A that is arranged to cooperate in a call setup with a verification of an assumed calling User Equipment (UE), wherein the. TAS-A comprises a receiver module arranged for receiving a verification request for verifying an assumed calling UE from the TAS-B, wherein the verification request results from a call setup request of the assumed calling UE. The verification request comprises an identifier identifying the assumed calling UE.

The TAS-A further comprising a status obtain module arranged for obtaining status information of the UE identifier in the verification request, and further comprising a transmitter module arranged for transmitting the status information obtained, to the TAS-B in response to the verification request from the TAS-B.

The solution provides a computer program product for application in the TAS-B that is configured for cooperating in a call setup with a verification of an assumed calling User Equipment (UE).

The computer program comprises computer code which, when run on processing circuitry of the TAS-B causes the TAS-B to receive a call setup request, resulting from a call setup request of the assumed calling UE, wherein the call setup request comprises an identifier that identifying the assumed called UE.

The computer program also causes the TAS-B to determine whether a verification of the assumed calling UE is required, and to transmit a verification request towards the TAS-A, which is associated to the assumed calling UE, wherein the address of the TAS-A is based on the assumed calling UE identifier.

The computer program further causes the TAS-B to receive a status information result from the TAS-A, in response to the verification request, and to determine on a call setup signalling with the called UE based on the received status information.

The solution provides a computer program product for application in the TAS-A that is configured for cooperating in a call setup with a verification of an assuming. User Equipment (UE).

The computer program comprises computer code which, when run on processing circuitry of the TAS-A, causes the TAS-A to receive a verification request for verifying an assumed calling UE from the TAS-B, wherein the request results from a call setup request of the assumed calling UE, and wherein the verification request comprises an identifier that identifies the assumed calling UE.

The computer program causes the TAS-A to obtain status information of the UE having the identifier in the verification request, and to transmit the status information obtained, to the TAS-B in response to the verification request to the TAS-B.

The method, system and devices proposed, advantageously provide an operator to offer its subscribers with a verification service of an assumed calling UE.

The emerging VoIP networks with their Internet connectivity are advantageously provided with a method and means to perform a verification of the calling UE, such that a perceived reliability of operators is maintained. The verification is advantageously only applied when required, e.g. when the called UE subscriber has subscribed to such a service, or when the call setup request is received from a network external to the operator's network.

The method proposed advantageously allows an operator to initialize a signalling of a call setup, wherein the assumed calling UE is recognized as being non-authentic, albeit that the called UE is notified on this occurrence, to be regarded as a warning towards the called UE.

Operators which provide this verification service may advantageously be recognized as trustworthy operators.

These and other embodiments according to the present invention are now illustrated in more detail with reference to the enclosed drawings.

BRIEF DESCRIPTION OF THE DRAWINGS

FIG. 7C is a signalling diagram illustrating an embodiment of a method;

FIG. 7D is a signalling diagram illustrating an embodiment of a method;

FIG. 8A is a block diagram illustrating an embodiment of a device;

FIG. 8B is a block diagram illustrating an embodiment of a device;

DETAILED DESCRIPTION

For the explanation of the solution, a Voice over Internet Protocol (VoIP) environment is applied, additionally an embodiment in an Internet Protocol (IP) Multimedia Subsystem (IMS) environment will be shown.

Figure 1:
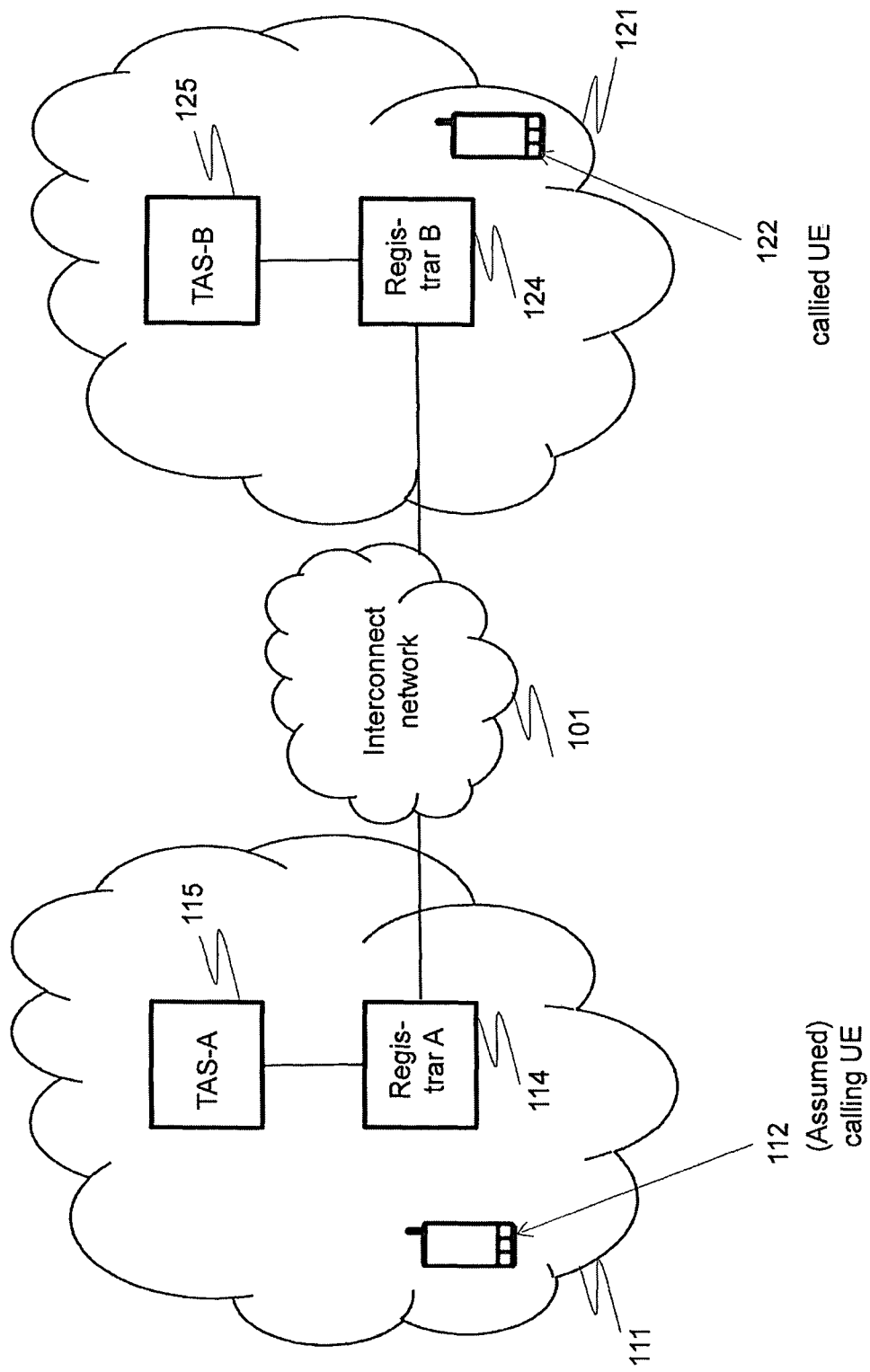
FIG. 1 is a block diagram illustrating an embodiment of a system.

FIG. 1 is a block diagram illustrating an embodiment of a system; FIG. 1 depicts a VoIP network according to the prior art, wherein a calling User Equipment 112, residing in a network 111, is setting up a call towards a called UE 122 in a network 121. The calling UE 112 is also denoted as calling party or A-party and can be identified by its identification or identifier known as Calling Party Number (CgPN). The network 111 where the calling UE 112 resides is indicated as A-network, first network or VoIP-A network.

The called UE 122 is also denoted as called party or B-party and can be identified by its identification or identifier known as Called Party Number (CdPN). The network 121 where the called UE 122 resides is indicated as B-network, second network or VoIP-B network.

The description in FIG. 1 uses terminology and description as commonly used for VoIP networks, such as Session Initiation Protocol (SIP) based VoIP networks.

FIG. 1 depicts nodes listed as Registrars 114 and 124, enabled to have a UE 112, 122 registered at a telecommunication service, provided by the operator of the A-network 111 or the operator of the B-network 121, respectively. It is assumed that the networks 111 and 121 are from different operators, the calling UE 112 is registered with Registrar A 114 maintained by operator A, and called UE 122 is registered with Registrar B 124 maintained by operator B.

A Registrar is the functional component where a VoIP subscriber registers. The VoIP subscriber provides a "binding" to the registrar. The binding comprises IP address and public user identity, which enables the registrar to offer an incoming communication session to the device (IP address) where the destination subscriber is currently reachable.

Telephony Application Servers (TAS-A) 115 and (TAS-B) 125 establish communication services for subscribers in the VoIP network. The Telephony application server is the functional component that provides the telephony service, as application on top of the network control plane protocol such as SIP. In both the A-network 111 and the B-network 121 the same VoIP architecture is suggested, although not necessarily. TAS-A 115 serves calling UE 112 and TAS-B 125 serves called UE 122.

The A-network 111 and the B-network 121 are connected by interconnect network 101. This Interconnect network 101 may be formed by an IPX (IP exchange). IPX is a telecommunications interconnection model for the exchange of IP, which is an interconnect network owned and operated by 3GPP operators and is assumed to be trustworthy.

Not all SIP signaling nodes or functional entities for regular call establishment are shown in FIG. 1. For example, inbound SIP server, Location server, Proxy SIP server etc. are not shown.

Figure 2:
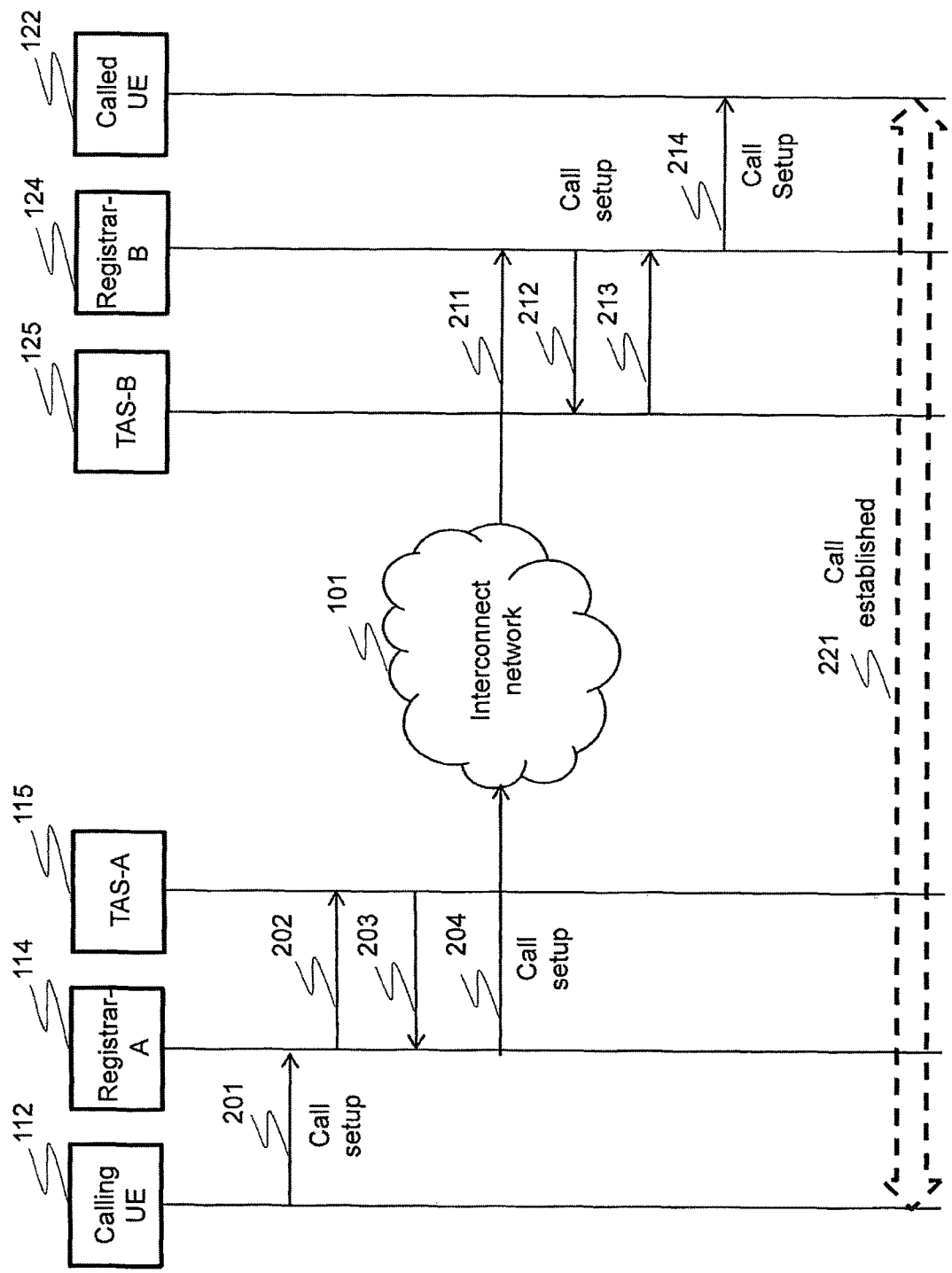
FIG. 2 is a signalling diagram illustrating an embodiment of a system.

FIG. 2 is a signalling sequence diagram illustrating an embodiment of a system; FIG. 2 depicts a signalling flow in a VoIP network according to prior art.

Calling UE 112 is supposed to be already registered with registrar A 114. Calling UE 112 composes a call request comprising its own identifier and an identifier identifying the called UE 122, as a setup message and signals 201 towards registrar A 114, to set up a call towards called UE 122.

Registrar A 114 interrogates 202, 203 TAS-A 115, for the purpose of originating call services to be applied. Additionally TAS-A applies B-number analysis and detects that the called party 122 is not part of the home A-network, such that routing to another network is required. Supposing there are no additional originating services that have impact on a straight forward call flow to be applied, registrar A continues with setting up 204 a call towards the Interconnect network 101.

The interconnect network 101 which is suggested to be operated according to an IPX structure, forwards the call setup based on the CdPN identifier, such that the call setup is received. 211 by Registrar B 124.

Registrar B queries 212, 213 TAS-B 125 to perform the calling UE 112 number analysis and for executing terminating services with respect to the called UE 122. Assuming no particular services are required, Registrar B signals 214 to the called UE for the call setup. When the called UE 122 answers the call from the calling UE 112, the establishment of the call between the calling UE and the Called UE is complete 221.

The signaling sequence diagram shown in FIG. 2 is based on the use of SIP as control plane protocol, which is the de facto standard for contemporary VoIP networks. Not all SIP signaling and SIP entities for regular call establishment is shown in the figure neither are all functional entities shown.

Figure 3:
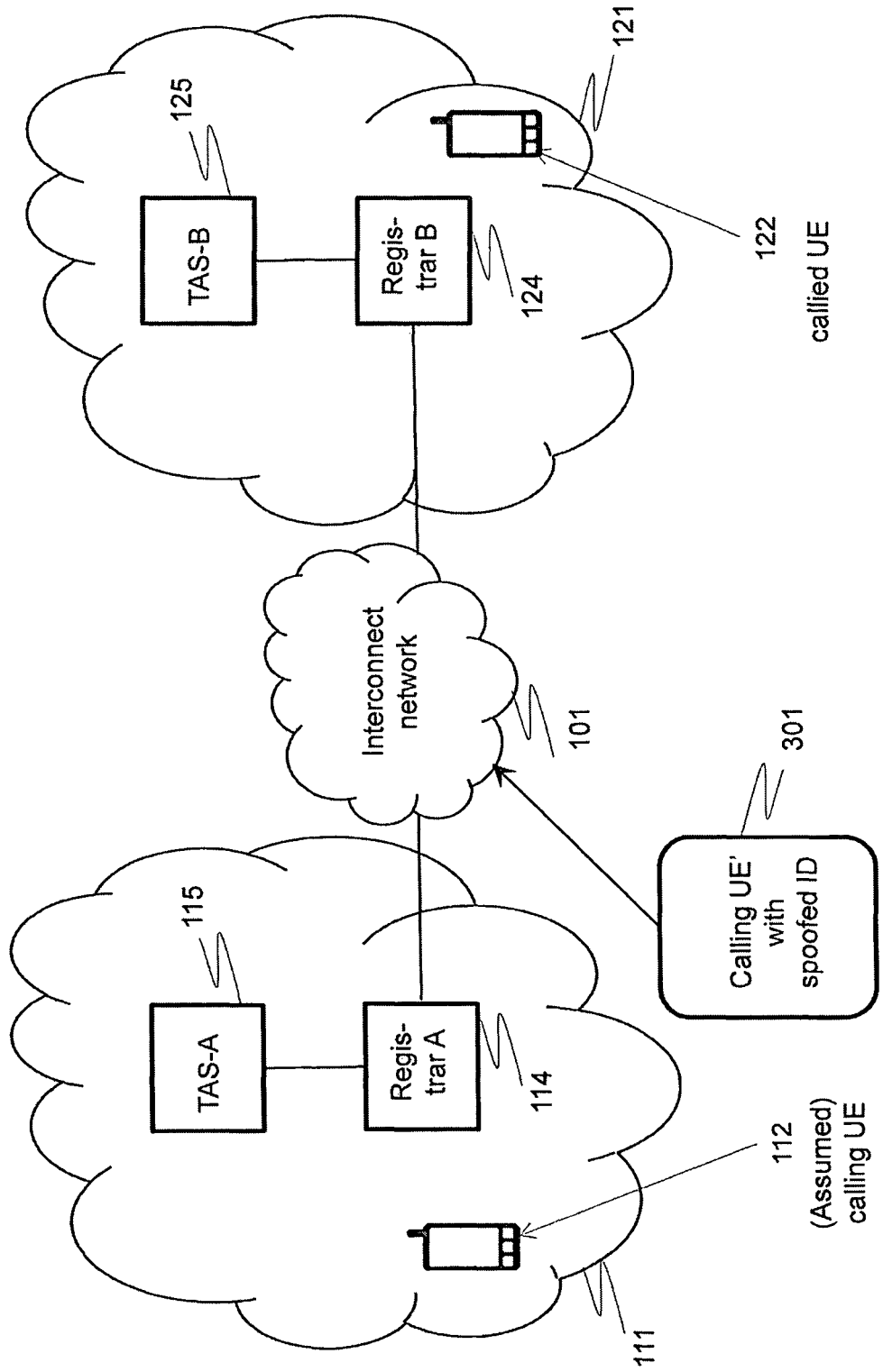
FIG. 3 is a block diagram illustrating an embodiment of a system.

FIG. 3 is a block diagram illustrating an embodiment of a system. FIG. 3 shows a network structure wherein a party, different from a calling party 112 residing in the A-network, can reach the party to be called 122.

FIG. 3 presents the case where the call is established through a bogus application server. The CgPN identity for the call as received in VoIP-B Network 121 points to a particular subscriber, the calling UE of a particular network, A-network 111. In reality, the call was not established by this calling UE 112 and the call did not follow the path through the interconnect network 101 and Registrar A 114 as shown.

As referred in the background section, a calling party that intends to be another party, based on its CgPN identity or Calling Line Identity (CLI), is regarded using a spoofed identity. This problem is mainly established by calls made from outside the network (foreign network) of the called party, but other examples may occur as well:

A call is established from a switch in the network of the called party; the call is routed towards a service node or application server in a foreign network, from where the call is routed (back) towards the network of the called party;

A call is established from a switch in a network not being the called party's network, in the same country as the network of the called party; the call is routed towards a service node or application server in foreign network, from where the call is routed towards the network of the called party.

In these cases the Registrar B cannot be aware whether the CgPN is representing the calling party 112, or representing the calling party 301, in other words "spoofed". This means that the received 211 call setup is either valid or spoofed, and that the CgPN is either a valid or a spoofed identifier. For the remainder of the description the term "assumed calling UE" is applied to indicate a calling UE 112 where the CgPN represents the calling UE 112, and is applied to indicate a calling UE 301 where the CgPN does not represent the calling UE 301.

Figure 4:
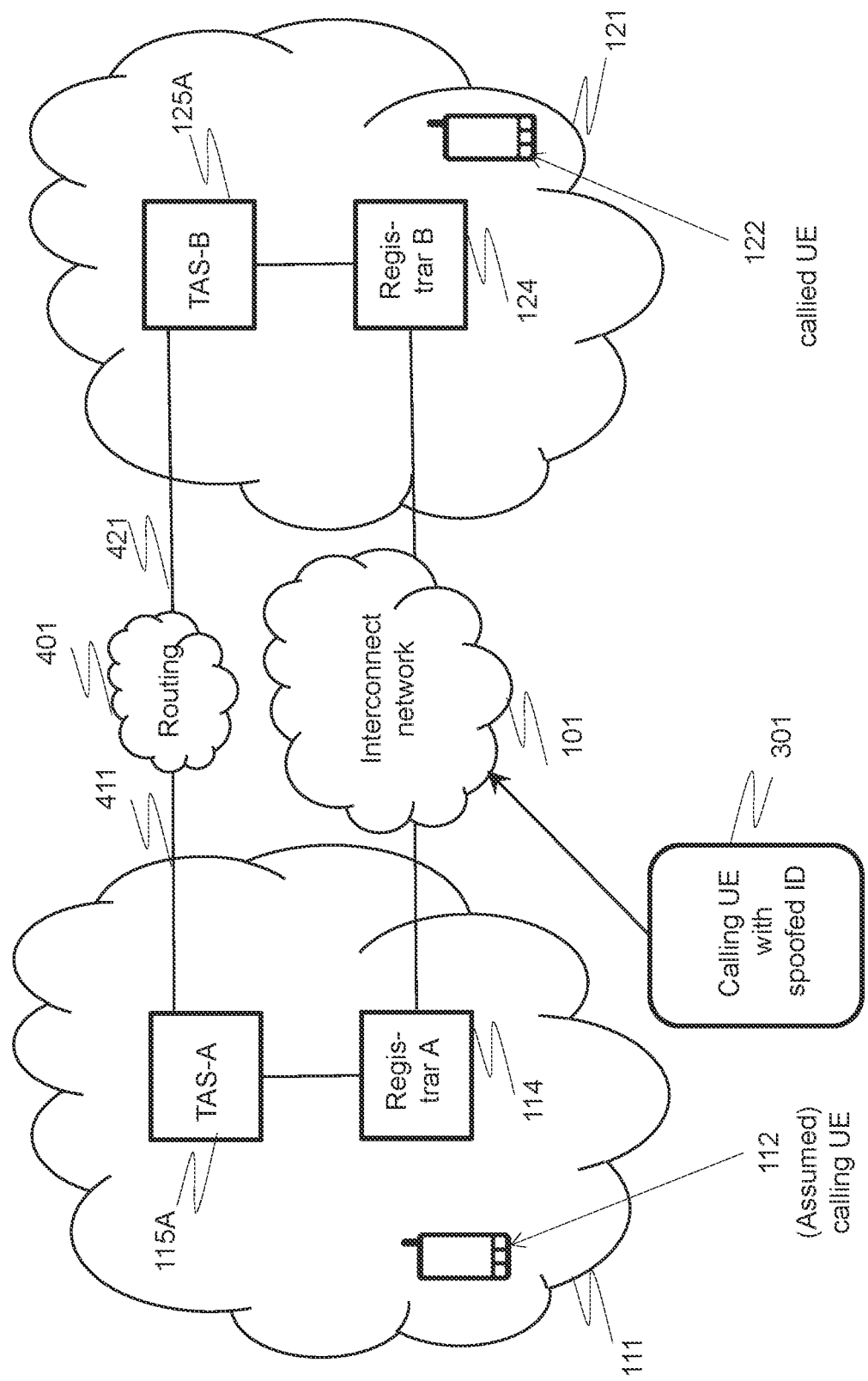
FIG. 4 is a block diagram illustrating an embodiment of a system.

FIG. 4 is a block diagram illustrating an embodiment of a system. FIG. 4 shows a network structure enabling a verification of an assumed calling User Equipment (UE) in a telecommunications network.

Additional to prior art FIGS. 1, 2 and 3, a number of features are presented that enable a verification of an assumed calling User Equipment (UE) in a telecommunications network.

A routing network 401 for control plane signaling is introduced with connecting links 411 and 421 to the TAS-A 115A and the TAS-B 125A respectively. Both Telephony Application Servers 115A and 125A have been adapted to support the proposed verification method.

TAS-A 115A will in the explanation below where applicable be indicated as "first node", and TAS-B 125A will be indicated as "second node". Before explanation initiates, the boundaries of the model wherein the method system and device are explained, are defined.

a) The VoIP network 111 of the assumed calling UE 112 is assumed to be trustworthy.
b) The VoIP network 121 of the called UE 122 is assumed to be trustworthy.
c) The signaling connection, depicted as "routing" network 401 between TAS-B 125A and TAS-A 115A, is assumed to be trustworthy.
d) Other networks, including the depicted Interconnect 101, are assumed to be non-trustworthy.

The "Other networks" comprise also trustworthy networks, e.g. VoIP networks of national operators. However, when a call arrives at the VoIP B-network 121, it can't be determined where that call originates from. And it can hence not be guaranteed that the CgPN number is authentic. In addition, the Interconnect 101 may be formed by IPX, which is, as proposed above, assumed to be trustworthy. However, calls arriving at the VoIP B-network 121 may have traversed other networks that are not connected to IPX. Or the call may originate from a network that allows bogus service providers to run an A-number spoofing service.

The routing network 401 enables the Telephony Application Servers 115A and 125A to exchange messages, beneficial for the proposed message exchanges for a verification of an assumed calling UE 112, 301.

For the routing network 401 it is proposed to apply a Diameter protocol e.g. based on 3GPP specification: 3GPP TS 29.229, enabling a signaling plane for a multimedia communications network.

Figure 5A:
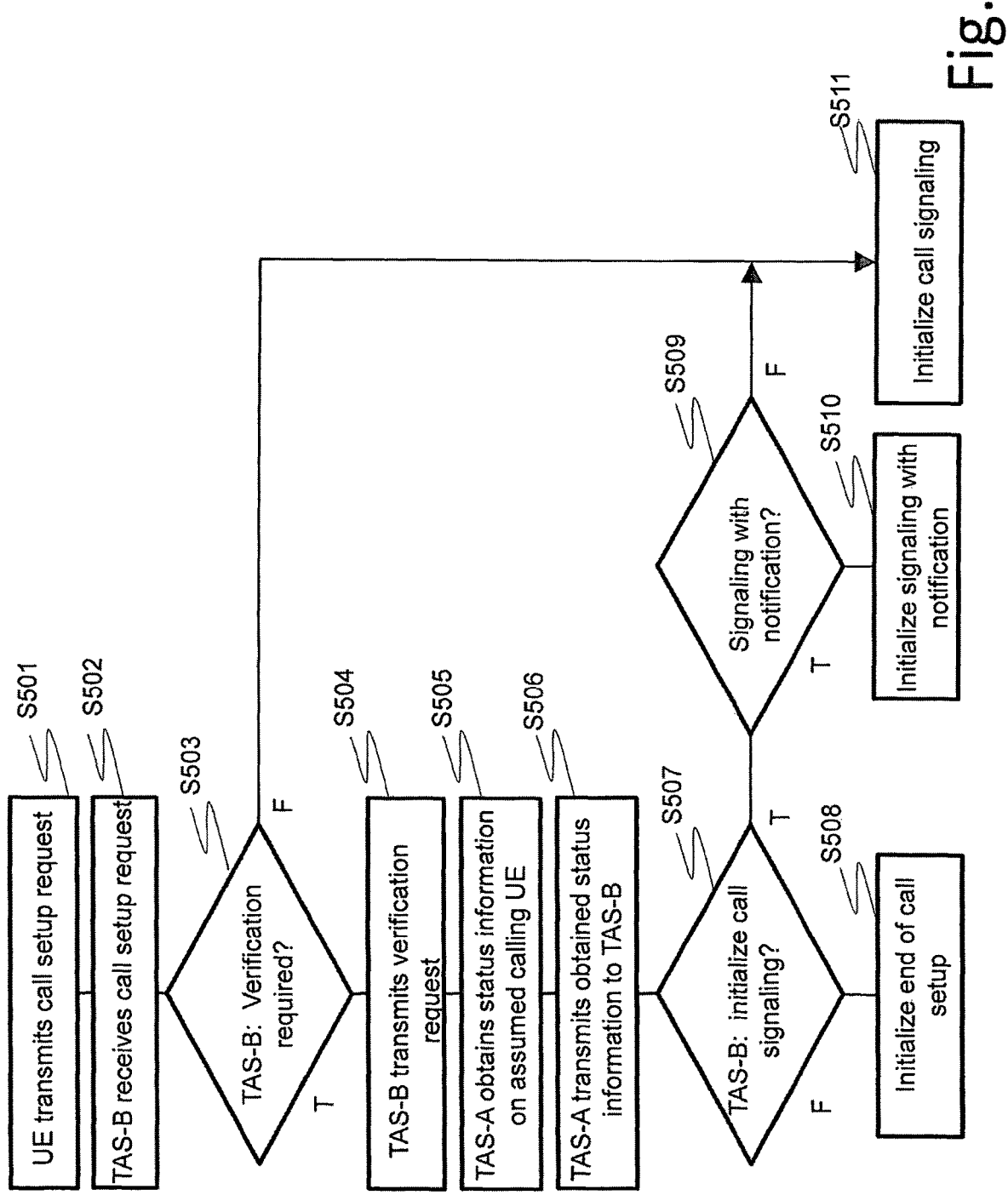
FIG. 5A is a flowchart diagram illustrating an embodiment of a method.

FIG. 5A is a flowchart diagram illustrating an embodiment of a method. FIG. 5A shows a flowchart describing a method for verification of an assumed calling User Equipment (UE) in a telecommunications network.

The explanation assumes that the calling UE performs a call setup with a CgPN identifier corresponding to its identity, so a valid call setup without spoofing.

The assumed calling UE 112 in the A-network transmits S501 a call setup request, which is received by the Registrar A, and according to prior art methods signalled S502 to TAS-B by Registrar A. The TAS-B determines S503 whether the subscriber of the CdPN has subscribed to a service for verification of the assumed calling UE, and when True (T) a number of actions are performed by the TAS-B 125A and the TAS-A 115A.

TAS-B 125A composes a verification request message comprising an identifier identifying the assumed calling UE 112, and transmits S504 this request message via the routing network 401 to the TAS-A 115A, where the address of the TAS-A is derived from the assumed calling UE identifier, explained below.

TAS-A 115A receives the verification request and contacts a storage comprised by TAS-A for obtaining S505 the status of assumed calling UE 112, and subsequently transmits S506 the obtained status towards TAS-B via the routing network 401.

TAS-B receiving a reply to its initial verification request decides S507 on further actions.

Suggest that the reply would indicate that the assumed calling UE 112 does not have a call setup in progress with the called UE. In this case, depending on the operator's choice and the subscriber's preferences, the call setup may be initialized to be rejected with a designated cause code, or a marking may be placed in the charging record (optionally combined with rejection action) S508.

Otherwise TAS-B can decide S509 to initialize a signaling of the call setup with a notification to subscriber S510. In this case the called UE is informed e.g. through non-intrusive audible indication or through push message notification, that the. CgPN for this call may be a spoofed number.

Otherwise when the reply indicates that the assumed calling UE 112 has a call setup with the called UE it is determined S507, S509 that the call setup signalling can be initialized S511, taken into account that the called party answers the call setup.

When the determination S503 whether verification is required would yield a False (F), the call flow would follow the common path and would lead to the initialization of a call setup signalling and call establishment S511, taken into account that the called party answers the call setup.

A variation on the verification would be expressed when: TAS-B in the transmit step (S504) also adds the identifier representative for the called UE 122. When the TAS-A has obtained the status information regarding the assumed calling UE, TAS-A determines whether the assumed calling UE is having a call setup with the indicated called UE, and the result is transmitted (S506) back to the TAS-B.

Another variation is proposed when the verification is performed during the call, at random moments in time or on user (called party) defined periods in time or frequently, depending on operator settings and user preferences.

Figure 5B:
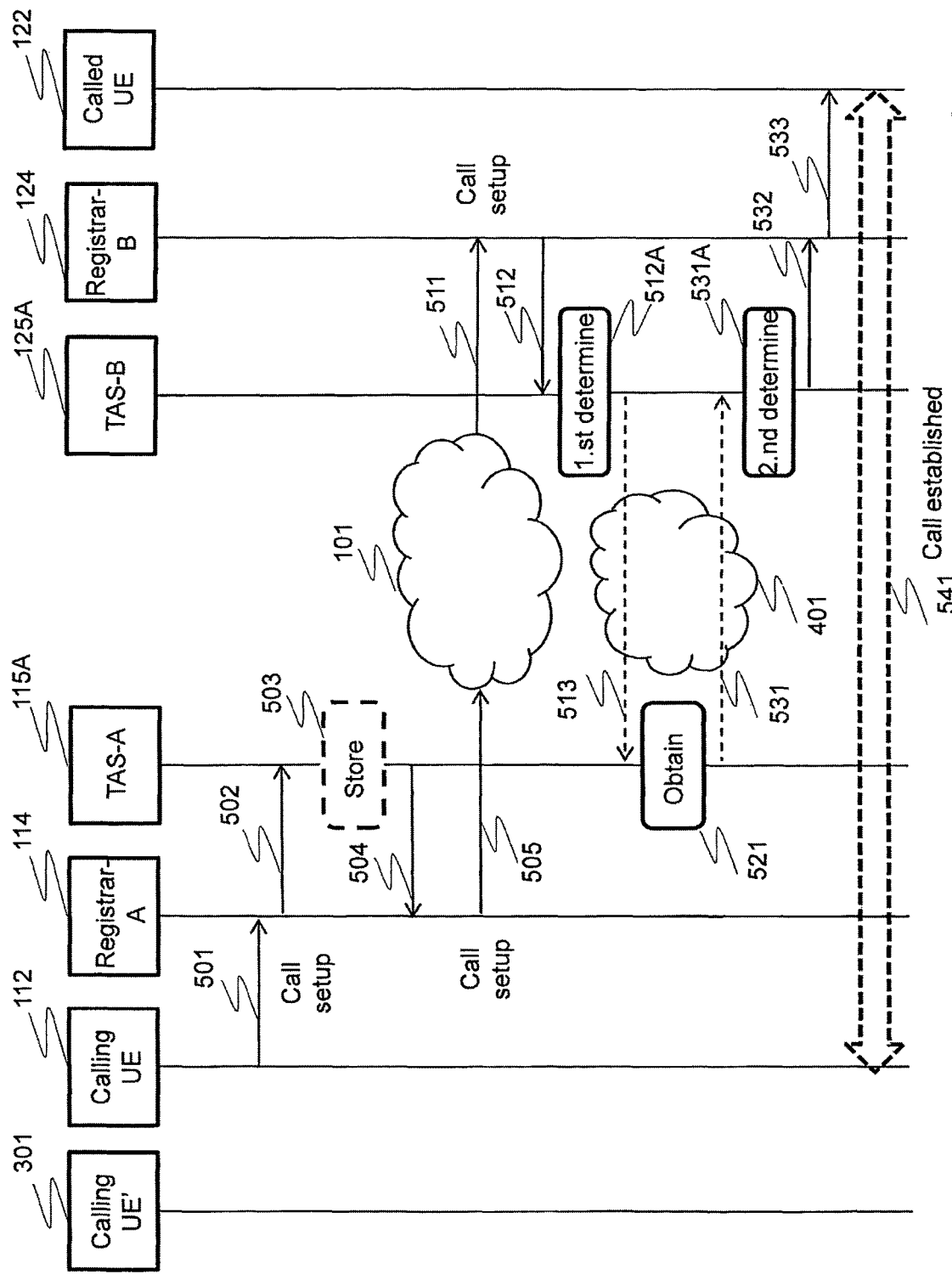
FIG. 5B is a signalling diagram illustrating an embodiment of a method.

FIG. 5B is a signalling sequence diagram illustrating an embodiment of a method. FIG. 5B shows a signalling sequence diagram describing a method for verification of an assumed calling User Equipment (UE) in a telecommunications network wherein the assumed calling UE is the calling UE 112 in the A-network 111.

Assuming that the calling UE 112 and the called UE 122 are registered in their respective registrars 114 and 124, the calling UE 112 composes a call setup request and transmits 501 the call setup request towards its Registrar A 114 in A-network 111.

The registrar A 114 receives 501 the call setup request and the TAS-A is signalled 502 to verify for originating services to be executed, and optionally as well to store 503 the call setup attributes, such as CgPN, CdPN and time. The attributes will be stored for a predetermined period.

Assuming that no particular services are required that would prohibit regular call establishment, TAS-A signals 504 the Registrar that the call setup process may proceed. The Registrar A subsequently forwards 505 the call setup request via the interconnect network 101 to the intended TAS-B based on CdPN analysis according to prior art methods. The Registrar B 124 receives 511 the call setup and will subsequently signal 512 TAS-B with the call setup request. The call setup request comprises the CgPN and the CdPN.

In a first determination 512A it is checked whether the subscriber of the called UE (with reference to the CdPN) has subscribed to a service to verify the assumed calling UE. When the subscriber of the called UE has subscribed to said verification service, a verification request is composed, wherein the request comprises the CgPN, a type of expected reply and optionally the CdPN.

The type of expected reply may be a first type wherein the reply indicates with which CdPN the assumed calling UE is currently having a call setup, or a second type, wherein a confirmation of the validity of the call setup is expected. In the latter case the CdPN is provided as well in the verification request.

The TAS-B transmits 513 the request to the relevant TAS-A, which' address is derived from the CgPN as explained below. The TAS-A receives the request and obtains 521 the status for the assumed calling UE with the identifier indicated in the verification request.

The indicated assumed calling UE in the request may have a call or call setup with the called UE, may have a call or call setup with another UE or may have no call or call-setup with any destination.

If the type of the verification request indicates that the status is expected, the TAS-A signals 531 the status as mentioned above to the TAS-B, for further determination. If the TAS-A is expected to make a determination on the validity of the call, the TAS-A may either use the optionally stored information in step 503, or retrieve data from its register on the status of the indicated assumed calling UE, and signals 531 that the indicated assumed calling UE has a call or call setup with the called UE or not. The TAS-B, receiving 531 the reply, will make a determination 531A as explained above in FIG. 5A whether to reject the call setup, or to signal 532, 533 the call setup, with or without notification. When the called UE answers, the call is established 541

Figure 6:
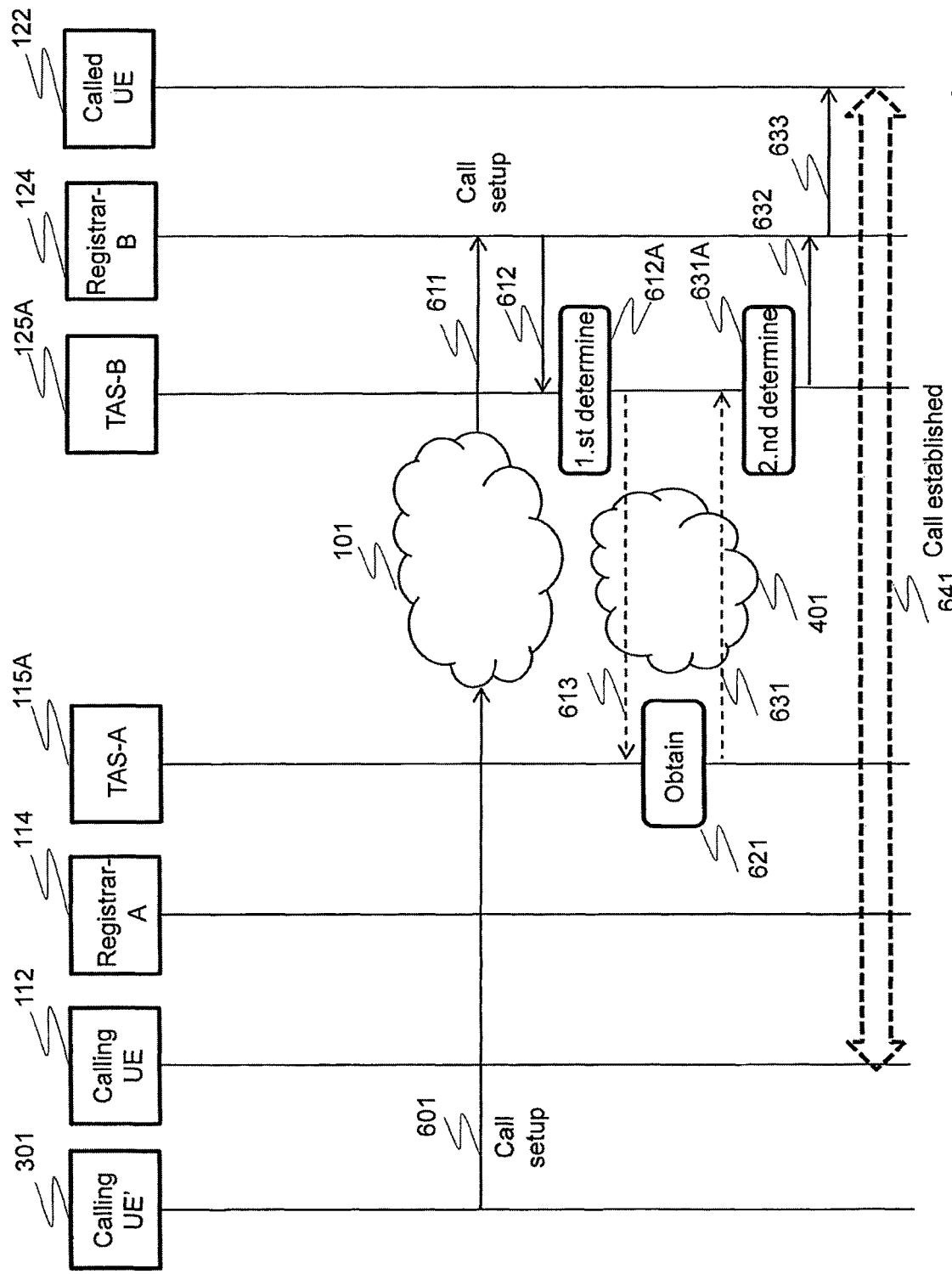
FIG. 6 is a signalling diagram illustrating an embodiment of a method.

Based on the status information the TAS-B may decide in a determination 531A, based on operator setting or user preferences to initialize a signalling to the called UE 122 with a notification or to reject the call setup. User preferences, may comprise a whitelist listing spoofed CgPNs that are still to be answered or a blacklist listing spoofed CgPNs that are to be rejected FIG. 6 is a signalling diagram illustrating an embodiment of a method. FIG. 6 shows a signalling diagram describing a method for verification of an assumed calling User Equipment (UE) in a telecommunications network wherein the assumed calling UE is the calling UE 301.

In FIG. 6 it is assumed that calling UE 301 is applying a spoofed CgPN. The spoofed CgPN belongs to UE 112, which is might be calling or having a call setup with another called UE than called UE 122 or having no call or call setup.

Calling UE' 301 sets up a call request 601, comprising the spoofed CgPN of assumed calling UE 112, via the interconnect network 101 towards B-network 121. The call is received 611 by Registrar B, which is unaware of this call being spoofed and forwards 612 the call setup to the TAS-B 125A. The first determination 612A is executed and it is supposed that a verification is required. The TAS-B will compose a verification request comprising the (spoofed) CgPN and transmits 613 this request to the TAS-A, based on the CgPN as explained below.

It might also occur that the provided CgPN cannot be mapped to a communication network. In this case it Is not feasible to send a query to a communications network associated with this A-party, and the status information is in this case provided by TAS-B and the process as depicted in FIG. 6 steps to the second determination 631A. See below.

TAS-A 115A receives 613 the verification request and obtains 621 the status information for the CgPN as provided in the call setup. Supposing that the verification of the call setup occurs in TAS-B, TAS-A transmits 631 a message to TAS-B, wherein the message comprises the status information that the assumed calling UE with the CgPN as provided has either no call setup- or call, or a call setup- or call with another CdPN. Additionally the TAS-A may have received the verification request as the CgPN satisfies TAS-B to route the request towards TAS-A, however TAS-A detected that the provided CgPN is not an existing directory number within the TAS-A. In the latter case the status information will indicate as such.

Based on the status information the TAS-B may decide in a determination 631A, based on operator setting or user preferences to initialize 632, 633 a signalling to the called UE 122 with a notification, or to reject the call setup. Establishment 641 may occur when the called UE 122 answers the call setup.

User preferences, may comprise a whitelist listing spoofed CgPNs that are still to be answered or a blacklist listing spoofed CgPNs that are to be rejected.

Figure 7A:
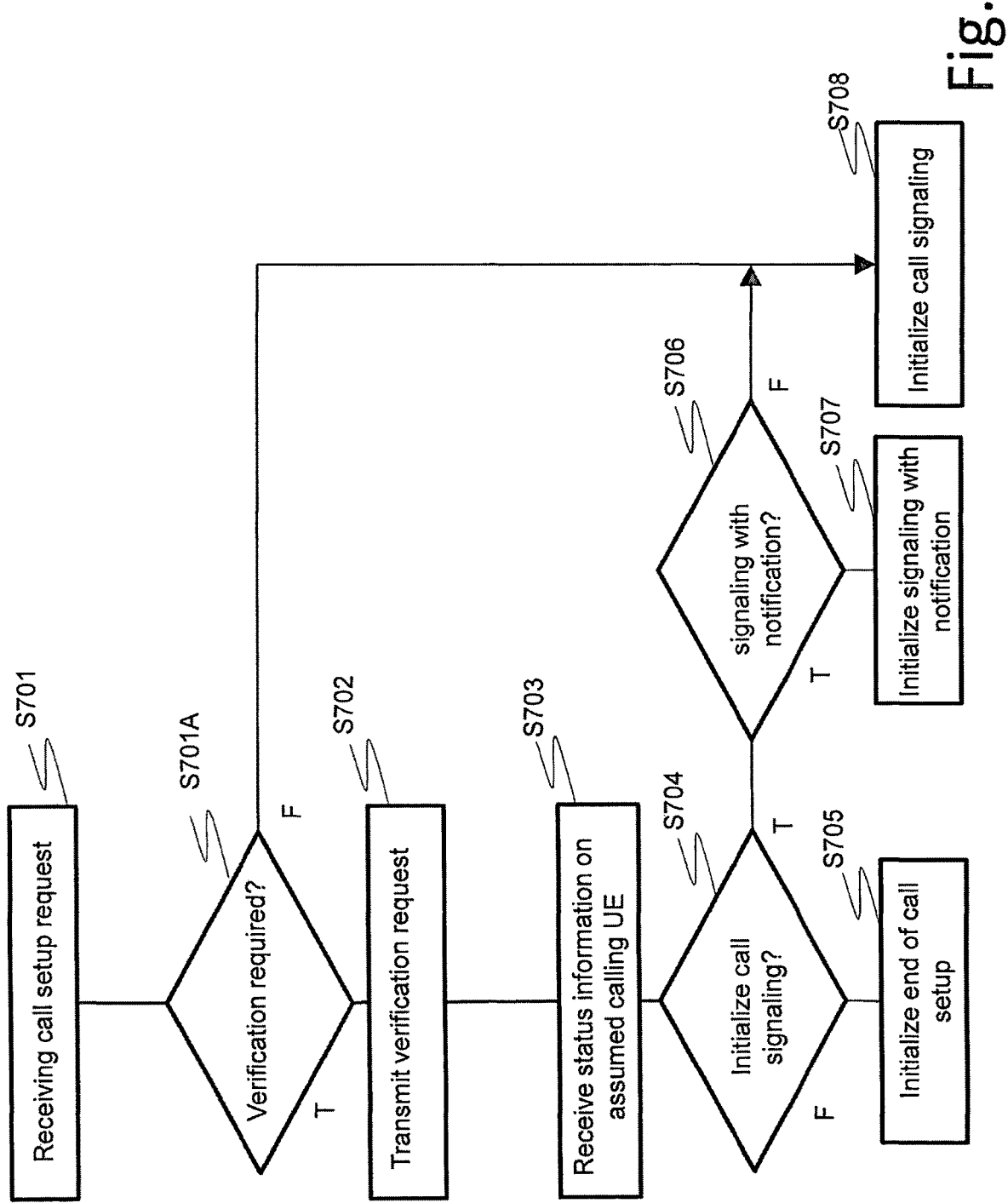
FIG. 7A is a flowchart diagram illustrating an embodiment of a method.

FIG. 7A is a flowchart diagram illustrating an embodiment of a method. FIG. 7A shows a flowchart diagram describing a method for verification of an assumed calling User Equipment (UE) in a second node being TAS-B 125B.

The assumed calling UE 112 in the A-network transmits a call setup request, which is received S701 by the TAS-B via the interconnect network, according to prior art signalling. The TAS-B determines S701A whether the subscriber of the CdPN has subscribed to a service for verification of the assumed calling UE, and when True (T) a number of actions are performed by the TAS-B 125A.

TAS-B 125A composes a verification request comprising an identifier identifying the assumed calling UE 112, and transmits S702 this request via the routing network 401 to the TAS-A 115A, where the address of the TAS-A is derived from the assumed calling UE identifier, explained below.

TAS-B receives S703 a reply to its initial verification request with status information, and decides S704 on further actions.

Suggest that the reply would indicate that the assumed calling UE 112 has not a call setup with the called UE. In this case, depending on the operator's choice, the subscriber's preferences the call setup may be initialized to be rejected with a designated cause code, or by placing a marking in the charging record (optionally combined with rejection action) S705.

Otherwise TAS-B can decide S706 to initialize an signalling of the call setup with a notification to subscriber S707. In this case the called UE 122 is informed e.g. through non-intrusive audible indication or through push message notification, that the CgPN for this call is a spoofed number.

Otherwise when the reply indicates that the assumed calling UE 112 has a call setup with the called UE it is determined S704, S706 that the call setup signalling S708 can be initialized, taken into account that the called party answers the call setup.

When at the determination S701A whether verification is required would yield a False (F) the call flow would follow the common path and lead to the initialization of a call setup establishment S708, taken into account that the called party answers the call setup.

A variation on the verification would be expressed when: TAS-B in the transmit step S702 also adds the identifier representative for the called UE 122. When the TAS-A is expected to perform the determination whether the UE represented by the CgPN has a call or call setup with the UE indicated by the CdPN. The result of this determination is received S703 by the TAS-B.

Another variation is proposed when the verification is performed during the call, at random moments in time or on user (called party) defined periods in time or frequently, depending on operator settings and user preferences.

Figure 7B:
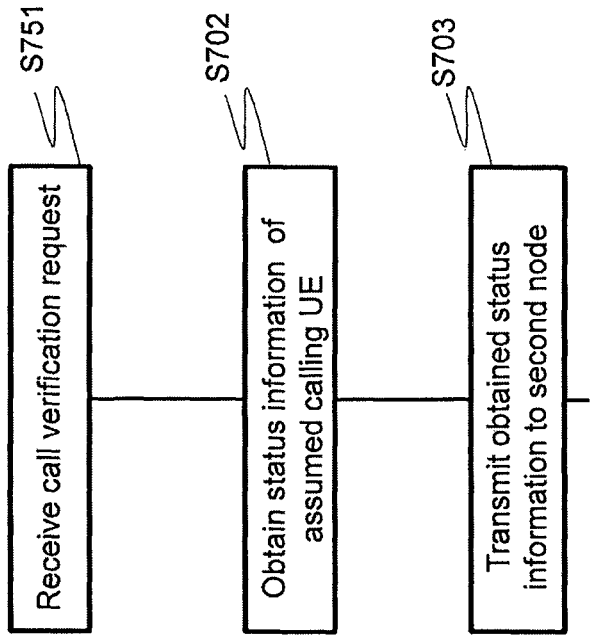
FIG. 7B is a flowchart diagram illustrating an embodiment of a method.

FIG. 7B is a flowchart diagram illustrating an embodiment of a method. FIG. 7B shows a flowchart diagram describing a method for verification of an assumed calling User Equipment (UE) in a first node being TAS-A 115A.

TAS-A receives S751 a verification request in response to a call setup request by the assumed calling UE 112 from the TAS-B 125A.

TAS-A obtains S702 the status for the UE indicated in the CgPN identifier in the verification request. Obtaining may occur from A register local to the TAS-A for maintaining the status of a call setup, or a storage local to the TAS-A wherein the CgPN and CdPN tuples are stored for a predetermined period. So only for an assumed calling UEs this tuple can be available in the storage, stored at step 503.

Depending on the verification request the TAS-A determines whether the CgPN and the CdPN do have a call setup or call, such that the TAS-A only confirms the request, or TAS-A provides TAS-B with status information on the UE represented by the CgPn, such that TAS-B is enabled to make a determination.

Subsequently TAS-A transmits S703 the obtained status or confirmation to TAS-B.

FIG. 7C is a signalling sequence diagram illustrating an embodiment of a method. FIG. 7C presents a method for verification of an assumed calling User Equipment (UE) in a network, where routing to the TAS-A is performed.

When the TAS-B sends the verification request via the Diameter priotocol it is proposed to apply a designated Diameter message towards TAS-A. This Diameter message, Get Call Status Request (GCSR), requests TAS-A to provide the call status of a the assumed calling party 112, whose identity is included in the GCSR Diameter message. TAS-A responds with Get Call Status Answer (GCSA) Diameter message. GCSA contains an indication of the status of the identified party; in this case the A-party.

The status may e.g. be Idle, Call_Establishment[B-party], Active_Call[B-party] etc. If GCSA contains "Active_Call [B-party]", then TAS-B determines that this A-party, as identified in the Invite request, is indeed establishing a call towards this B-party. The calling party number is hence considered *valid*, i.e. authentic, and the call establishment continues as normal. The GCSR/GCSA is proposed as a Diameter message.

With reference to FIG. 7C, TAS-B 125A constructs a Diameter GCSR message, containing the received CgPN identifier in the call setup request by the calling UE Diameter routing is designed to route messages based on the User-Identity. The GCSR message is routed 613A towards a Location server 701 that is serving the target user, i.e. the User-Identity contained in GCSR. This Location server keeps track of the TAS-A 115A in which this subscriber is currently registered. Hence, The address of TAS-A is derived from the CgPN identifier, which a public identity of the CgPN. Location. Server 701 forwards 613B the GCSR towards TAS-A. In an embodiment, the Location Server 701 receiving GCSR will determine whether the sending entity (such as a Telephony application server, TAS-B 125A) is authorized to send a GCSR towards this Location Server.

TAS-A is, by design, aware of the status of the indicated subscriber. Hence, TAS-A responds 631A with GCSA, including the required information, towards Location Server 701. Location Server A forwards 631B GCSA towards TAS-B.

FIG. 7D is a signalling sequence diagram illustrating an embodiment of a method. FIG. 7D presents a method for verification of an assumed calling User Equipment (UE) in a network, where routing to the TAS-A is performed.

FIG. 7D depicts the use of Diameter Routing Agent (DRA) in the Diameter signaling and a Diameter Edge agent (DEA), wherein the DEA servers 721 and 731 constitute a bridge between networks of different operators.

In a first step for submitting the verification request (GCSR), the TAS-B transmits 613C the GCSR to the DRA 711 When the DRA in the network of the initiator (TAS-B 125A) determines from its local database that the target subscriber is not a subscriber served by its own operator's network, it performs a "Portability lookup" In a database. The DRA 711 is, hereto, equipped with a functional connection to the operator's own copy of the national Number Portability database.

The DRA can hence receive an NP Routing prefix associated with the network serving the target (TAS-A) subscriber. Since the NP Routing prefix relates to another network, the DRA forwards 613D the Diameter message to the DEA 721. The DEA 721 is designed to select the target network based on the NP Routing prefix, and routes 613E the GCSR to the DEA 731 of the responder or target network.

The target network contains likewise a DEA 731 and a DRA. Hence, the target network is capable of routing the Diameter message to the correct Location Server 701. In this case, as depicted in FIG. 7D, the DEA 731 of the target network routes 613F all incoming messages to the Location server 701. The location server 701, as stated in FIG. 7C is arranged to transmit 613G the GCSR to TAS-A 115A.

The reply GCSA Diameter message is assumed to be routed 631C, 631D, 631E, 631F, 631G, back to the originating TAS-B according to the path built between both ends, preferably accumulated in the message structure wherein each address of the sequence is attached to the message.

FIG. 8A is a block diagram illustrating an embodiment of an entity. FIG. 8A depicts the internal structure of a TAS-A and TAS-B for verification of an assumed calling User Equipment (UE). TAS-A and. TAS-B can be mutually exchanged while there structure can be identical, albeit that certain internal units are only applied when functioning as a TAS-A 115A, and other internal units only applied when functioning as a TAS-B 125B, hereinafter denoted as Telephony Application Server, The TAS comprises a memory 802 arranged for storing program instructions, settings, configuration data and variables. The processor 801 controls the TAS, under the program instructions stored in the memory, and comprises the modules:

Part A General units:
Besides the processor and memory other general units like
  a scheduler, and timer, not shown.
Part B, Units active when operating as a TAS-A:
Store/Retrieve A-B association 807, acting when steps 503
  and optionally 521 are applied, and
Obtain A status module, for obtaining the status information
  of the assumed calling UE 112 according to the CgPN
  identifier.
Part C, Units active when operating as a TAS-B:
1,st determination unit 808, for determining whether the
  subscriber of the called
  UE has subscribed to a service for verifying the assumed
  calling UE;
2.nd determination unit 809, for determining whether the
  call setup should be signalled to the called party, and if to
  be signalled, with or without notification;
Compose verification request unit 805, for composing a
  request message to the TAS-A to retrieve status information on the assumed calling UE, and
Routing module, for routing the verification request to the
  TAS-A via the routing network 401, wherein the address
  of the TAS-A should is derived from the CgPN identifier.
Additionally the TAS has an Interface module 810, 810A, 810B to receive and transmit messages to network nodes. Interface 810A is arranged to connect via the interconnect network 101, and Interface 810B is arranged to connect via the routing network 401.

FIG. 8B is a block diagram illustrating an embodiment of an entity. FIG. 8B depicts the internal structure of a TAS-A and TAS-B for verification of an assumed calling User Equipment (UE). TAS-A and TAS-B can be mutually exchanged while there structure can be identical, albeit that certain internal units are only applied when functioning as a TAS-A 115A, and other internal units only applied when functioning as a TAS-B 125B, hereinafter denoted as Telephony Application Server, The TAS comprises a memory 802 arranged for storing program instructions, settings, configuration data and variables. The processor 801 controls the TAS, under the program instructions stored in the memory.

Additionally the TAS has an Interface module 810, 810A, 810B to receive and transmit messages to network nodes. Interface 810A is arranged to connect via the interconnect network 101, and Interface 810B is arranged to connect via the routing network 401.

Figure 9:
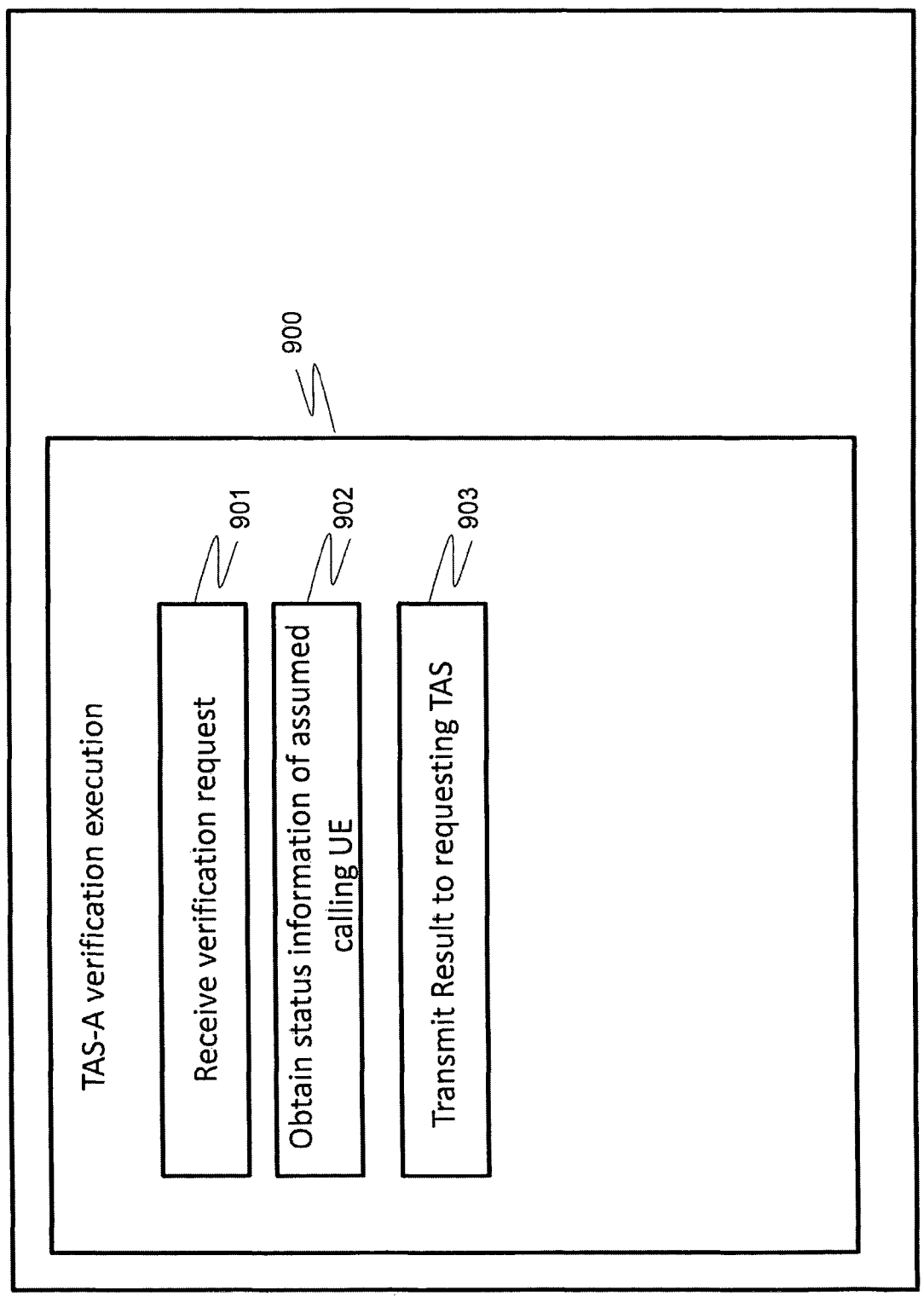
FIG. 9 is a block diagram illustrating an embodiment of an entity.

FIG. 9 is a block diagram illustrating an embodiment of modules. FIG. 9 depicts the modules residing in the TAS-A node 115A, 900.

The receive verification request module 901 is arranged to receive a verification request from the TASB, comprising the CgPN of the assumed calling UE.

The Obtain status information of the assumed calling UE module 902, is arranged to obtain the status information of the internal registers to the TAS-A or Registrar A114 regarding the status of the UE, associated with the CgPN in the verification request.

The Transmit Result to requesting TAS module 903, is arranged to compose a reply message to the TAS-B, wherein the reply message comprises either a confirmation of the call setup status of CgPN with CdPN, the CgPN and the CdPN, or another status indicating e.g. that the CgPN is not known or not subscribed to the Registrar A.

Figure 10:
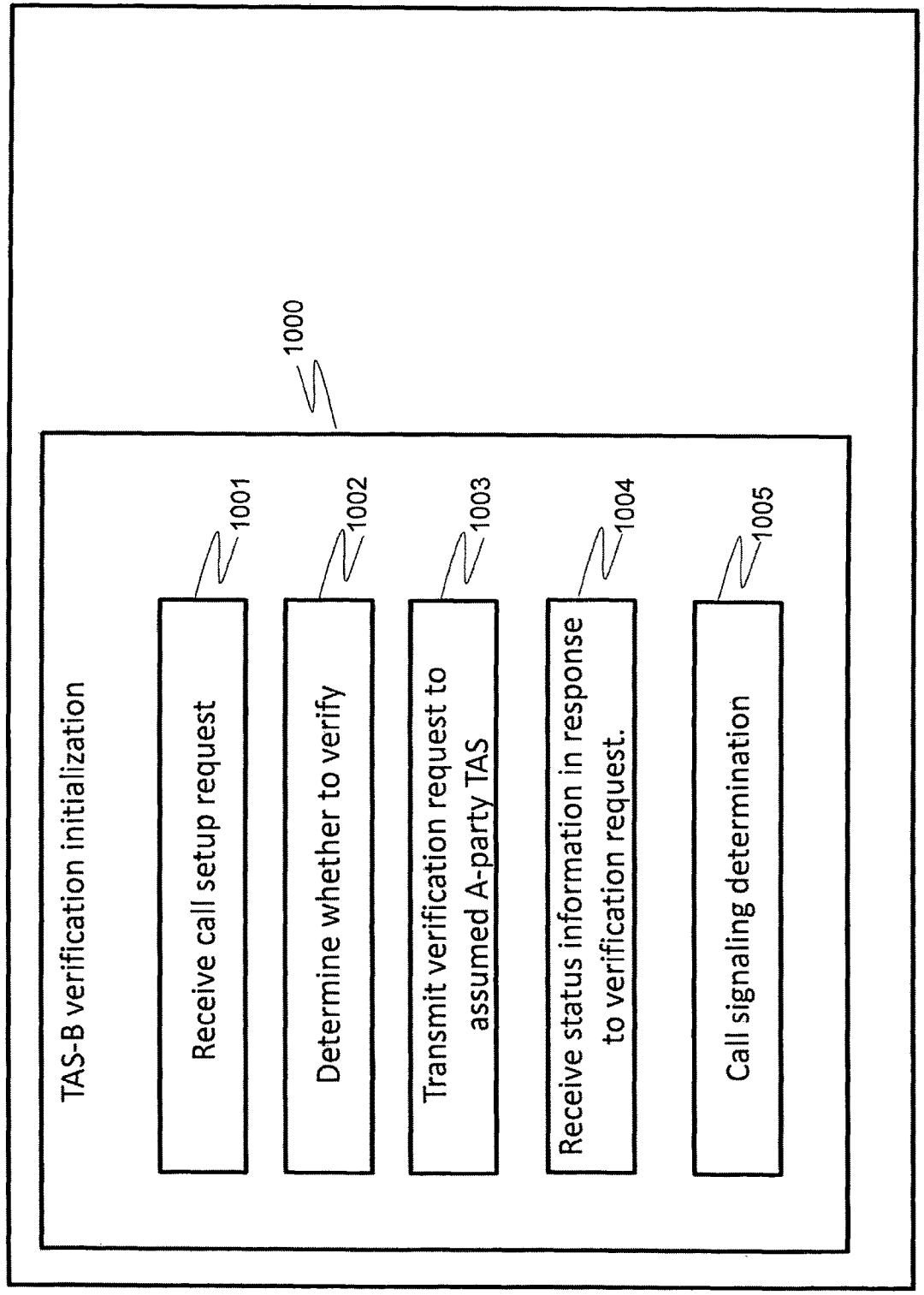
FIG. 10 is a block diagram illustrating an embodiment of an entity.

FIG. 10 is a block diagram illustrating an embodiment of modules. FIG. 10 depicts the modules residing in the TAS-B node 125A, 1000.

The receive a call setup request module 1001, is arranged to receive a call setup request initialized by the calling UE 112, 301.

The Determine whether to verify module 1002, is the 1.st determination module that is arranged to determine whether the subscriber of the called UE has subscribed to a service to verify the assumed calling UE.

The Transmit a verification request to the assumed A-party TAS 1003, is arranged to determine the address of the TAS-A based on the CgPN received in the call setup request, and to transmit the request to the determined TAS-A.

The receive status information in response to the verification request module 1004, is arranged to receive the status information from the TAS-A, which has obtained the requested status.

The Call signalling determination module 1005, is arranged to determine whether the call setup should be signalled to the called UE, or signalled with a notification to the called UE, or rejected.

As the verification is in particular useful when the call setup has entered the network of an operator, e.g. by the Network-Session Border Gateway (N-SBG) of the operator, it is regarded beneficial to the operator to mark this call setup, as this call setup is potentially spoofed. It is proposed that a call setup request entering the operator's network, receives a marker, e.g. by the N-SBG, which can be applied in the first determination 512A, 612A, for determining whether a verification of the assumed calling UE is required. Calls that do not leave the operator's network might be regarded as trustful, and as such do not need verification of the CgPN. A marker in a SIP INVITE message in the call setup request might have the form of a parameter in the P-asserted-id (PAI), e.g.:

P-asserted-id: <sip:+
  31651613908@ims.mnc004.mcc204.3gppnetwork.org>;
  na

The parameter "na" indicates that the PAI is not authenticated. This parameter is conveyed through the network and will in any case be removed when the Invite leaves the network, such as when offering the Invite towards the called party. The TAS-B will apply the assumed calling UE verification only when the na parameter is present in the PAI. Upon successful authentication of the A-party number, the TAS-B will remove the na parameter.

The Method, system and device as proposed for verification of an assumed calling User Equipment (UE), is explained in a VoIP network environment, but can be applied for other network technologies as well. In an Internet Protocol (IP) Multimedia Subsystem (IMS) the solution is like applicable wherein the same functions as TAS and Registrar are available. Albeit that the conventional naming of these entities is different.

The TAS of VoIP is the Session Initiation Protocol-Application Server (SIP-AS) in IMS and the Registrar in VoIP is the Serving-Call Session Control Function (S-CSCF). A location server, applied for routing the verification request by the TAS-B to the TAS-A in a VoIP network could be implemented in an IMS network with the Home Subscriber Server (HSS) in the IMS network.

The adding of a marker in a call setup request as performed by the N-SBG in a VoIP network can be accomplished by a Media Gateway Control Function in an IMS network.

The method, system and devices proposed, advantageously provide an operator to offer its subscribers with a verification service of an assumed calling UE.

The emerging VoIP networks with their internet connectivity are advantageously provided with a method and means to perform a verification of the calling UE, such that a perceived reliability of operators is maintained. The verification is advantageously only applied when required, e.g. when the called UE subscriber has subscribed to such a service, or when the call setup request is received from a network external to the operator's network.

The method proposed advantageously allows an operator to initialize an call setup signalling and call establishment, wherein the assumed calling UE is recognized as not being the party the calling UE claims to be, albeit that the called UE is notified on this occurrence, to be regarded as a warning.

Operators which provide this verification service may be advantageously recognized as trustworthy operators.

The invention claimed is:

1. A call setup method with a verification of an assumed calling User Equipment (UE) in a second node comprised by a telecommunications network, the telecommunications network further comprising a first node, the assumed calling UE and a called UE, the first node, the second node, the assumed calling UE and the called UE being communicatively connected, wherein the method comprises the steps of:
   receiving a call setup request comprising an identifier identifying the assumed calling UE;
   transmitting to the first node a verification request comprising the identifier identifying the assumed calling UE;
   receiving from the first node status information of the assumed calling UE; and
   determining whether, depending on the status information, to initiate signaling of the call set up with the called UE.

2. The method of claim 1 wherein the transmitting step comprises:
   analyzing the identifier of the assumed calling UE for defining how to route the verification request towards the first node, and
   composing the verification request for transmitting to the first node.

3. The method of claim 2 wherein the verification request additionally comprises an identifier identifying the called UE, such that the first node is enabled to perform a test whether the assumed calling UE is having a call setup to the called UE or having a call with the called UE.

4. The method of claim 1, wherein the second node verifies, based on the received status information and an identifier identifying the called UE, whether the assumed calling UE is having a call setup to the called UE or having a call with the called UE.

5. The method of claim 4, wherein the second node performs the verification during a call setup by the assumed calling UE, during a call between the assumed calling UE and the called UE, or after a call between the assumed calling UE and the called UE.

6. A call setup method with a verification of an assumed calling User Equipment (UE) in a first node in a telecommunications network, the telecommunications network further comprising a second node, the assumed calling UE and a called UE, the first node, the second node, the assumed calling UE and the called UE being communicatively connected, wherein the method comprises the steps of;
   receiving a verification request from the second node, resulting from a call setup request, the verification request comprising an identifier identifying the assumed calling UE; and
   obtaining status information of the assumed calling UE, the status information including whether the assumed calling UE has a call setup or a call with the called UE.

7. The method of claim 6, wherein the verification request additionally comprises an identifier identifying the called UE.

8. The method of claim 6, wherein the first node obtains the status information of the assumed calling UE and transmits this information towards the second node for enabling the second node to make a further determination.

9. A second node arranged to cooperate in a call setup with a verification of an assumed calling User Equipment (UE), the second node being configured for use in a telecommunications network that further comprises a first node, the assumed calling UE and a called UE, the first node, the second node, the assumed calling UE and the called UE being communicatively connected, the second comprising node comprising:
   an I/O circuit configured for one or more other nodes in the telecommunications network;
   a processing circuit operatively coupled to the I/O circuit; and
   a memory operatively coupled to the processing circuit and storing program instructions for execution by the processing circuit, whereby the processing circuit is configured to:
      receive, via the I/O circuit, a call setup request comprising an identifier identifying the assumed calling UE,
      compose a verification request, the request comprising the identifier identifying the assumed calling UE,
      determine how to route the verification request towards the first node based on the identifier identifying the assumed calling UE,
      transmit, via the I/O circuit, the verification request towards the first node,
      receive, via the I/O circuit, status information of the assumed calling UE, and
      determine, based on the status information, whether to initiate signaling of the call setup with the called UE.

10. A first node arranged to cooperate in a call setup with a verification of an assumed calling User Equipment (UE), the first node configured for operation in a telecommunications network that further comprises a second node, the assumed calling UE and the called UE, the first node, the second node, the assumed calling UE and called UE being communicatively connected, the first node comprising:

an I/O circuit configured for one or more other nodes in the telecommunications network;

a processing circuit operatively coupled to the I/O circuit; and a memory operatively coupled to the processing circuit and storing program instructions for execution by the processing circuit, whereby the processing circuit is configured to:

receive, via the I/O circuit, a verification request, resulting from a call setup request, the verification request comprising an identifier identifying the assumed calling UE, obtain status information of the assumed calling UE, the status information including whether the assumed calling UE has a call setup or a call with the called UE, and transmit the obtained status information towards the second node, via the I/O circuit.

\* \* \* \* \*